(12) United States Patent
Cui et al.

(10) Patent No.: US 12,311,721 B2
(45) Date of Patent: May 27, 2025

(54) SINGLE AXLE SUSPENSION SYSTEM AND ASSOCIATED METHODS

(71) Applicant: Good RV Equipment INC, Marysville, WA (US)

(72) Inventors: Yanfeng Cui, Marysville, WA (US); Kelly Zuoer Cui, Marysville, WA (US)

(73) Assignee: Good RV Equipment INC, Bellingham, WA (US)

( * ) Notice: Subject to any disclaimer, the term of this patent is extended or adjusted under 35 U.S.C. 154(b) by 0 days.

(21) Appl. No.: 18/482,987

(22) Filed: Oct. 9, 2023

(65) Prior Publication Data
US 2025/0115088 A1    Apr. 10, 2025

(51) Int. Cl.
*B60G 13/00* (2006.01)
*B60G 3/04* (2006.01)

(52) U.S. Cl.
CPC ............. *B60G 3/04* (2013.01); *B60G 13/003* (2013.01); *B60G 2206/91* (2013.01); *B60G 2300/04* (2013.01)

(58) Field of Classification Search
CPC ................................. B60G 3/04; B60G 13/003
See application file for complete search history.

(56) References Cited

U.S. PATENT DOCUMENTS

| | | | | |
|---|---|---|---|---|
| 3,746,361 A * | 7/1973 | McGee | ..................... | B60G 5/06 267/248 |
| 3,752,498 A * | 8/1973 | Shea | ..................... | B60G 17/04 280/124.159 |
| 4,568,094 A * | 2/1986 | Lovell | ..................... | B60G 5/00 280/789 |
| 5,186,485 A * | 2/1993 | Orr | ..................... | B60G 11/27 280/681 |
| 5,427,404 A * | 6/1995 | Stephens | ................ | B60G 9/003 267/229 |
| 6,227,338 B1 * | 5/2001 | Becker | ................. | B60G 13/003 188/297 |
| 10,791,664 B2 * | 10/2020 | Garcia | ................. | A01B 59/042 |
| 2002/0163165 A1 * | 11/2002 | Adema | .................... | B60G 5/02 280/682 |
| 2003/0209872 A1 * | 11/2003 | Baxter | ..................... | B60G 9/02 280/124.128 |
| 2008/0084047 A1 * | 4/2008 | Bluff | ..................... | B60G 11/28 280/124.1 |

(Continued)

FOREIGN PATENT DOCUMENTS

| AU | 2010100835 A4 * | 9/2010 |
|---|---|---|
| AU | 2017399666 A1 * | 9/2019 |

(Continued)

*Primary Examiner* — Nicole T Verley
(74) *Attorney, Agent, or Firm* — Perkins Coie LLP

(57) ABSTRACT

A suspension system for a trailer and associated methods are provided. In some embodiments, the suspension system includes (1) one or more first shock-absorbing components; (2) a second shock-absorbing component; and (3) a connecting member configured to position and connect the first shock-absorbing components and the second shock-absorbing component. The connecting member includes a supporting base configured to support the first shock-absorbing component. The connecting member includes a contacting surface member configured to be in contact with the second shock-absorbing component.

18 Claims, 16 Drawing Sheets

(56) References Cited

U.S. PATENT DOCUMENTS

2023/0226867 A1 * 7/2023 De Rycke ............ F16F 13/002
                                                                280/6.157

FOREIGN PATENT DOCUMENTS

| | | | |
|---|---|---|---|
| CA | 2488135 A1 * | 5/2005 | |
| CN | 201400203 Y * | 2/2010 | |
| CN | 220096554 U * | 11/2023 | |
| RU | 2767801 C1 * | 3/2022 | |
| SE | 538947 C2 * | 2/2017 | |

* cited by examiner

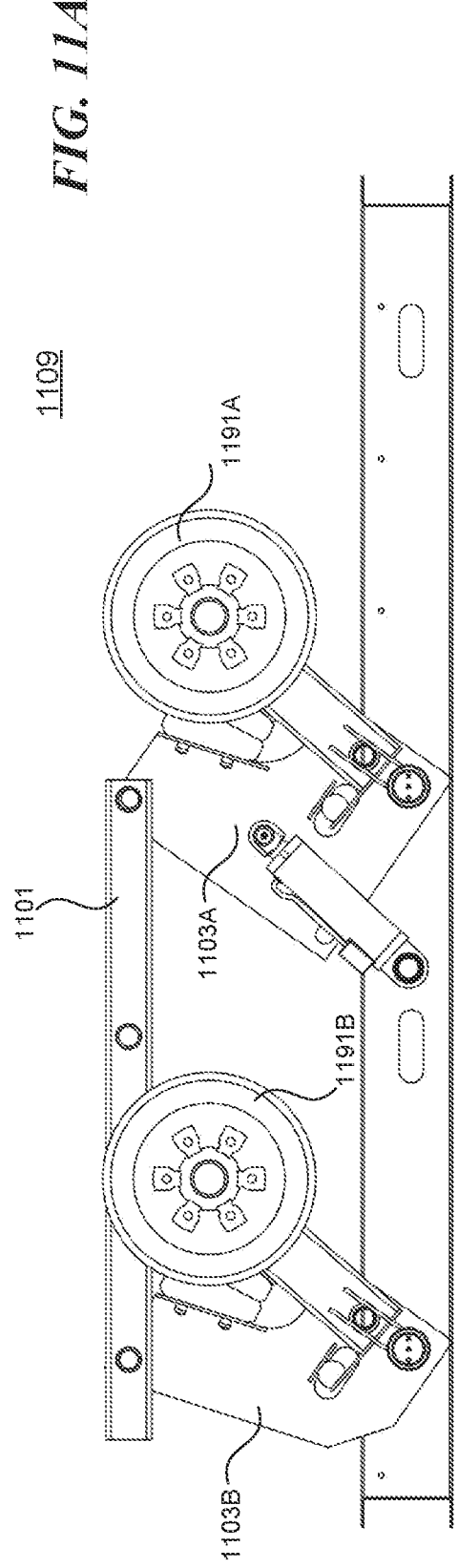
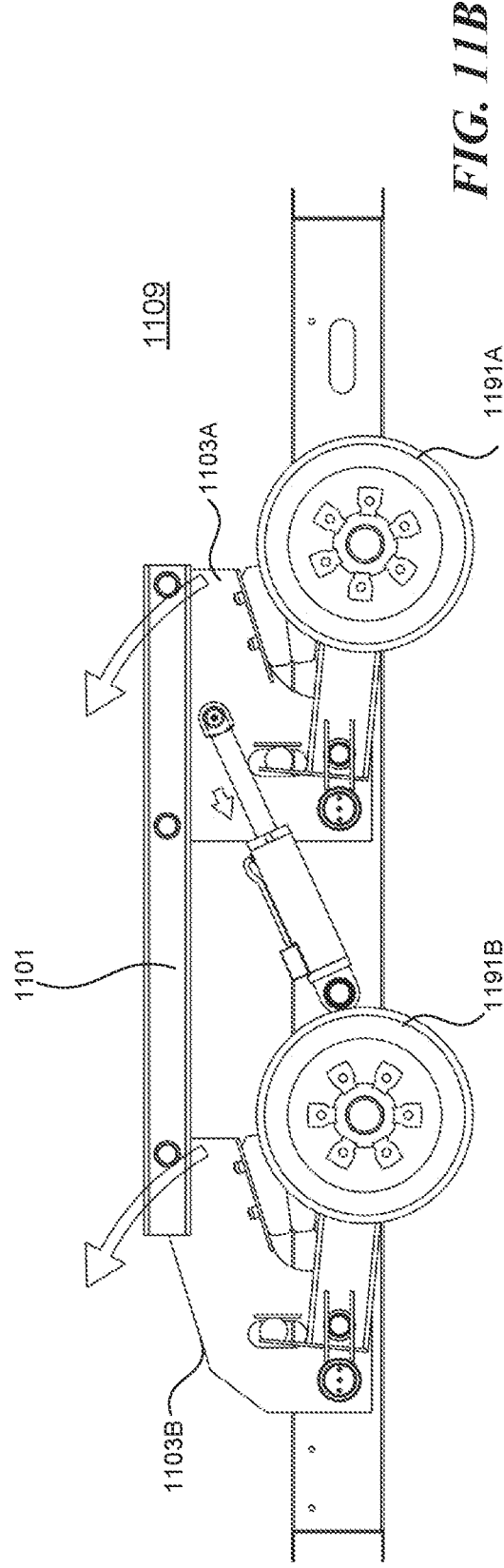

1201 Stacking two or more first shock-absorbing components

1203 Connecting the two or more first shock-absorbing components to a supporting base of a connecting member 1205 Positioning the first shock-absorbing component between the supporting base of the connecting member and a slant surface of a first housing element 1207 Connecting a second shock-absorbing component to a contacting surface member of the connecting member 1209 Positioning the second shock-absorbing component between the contacting surface member of the connecting member and a vertical surface of the first housing element

SINGLE AXLE SUSPENSION SYSTEM AND ASSOCIATED METHODS

TECHNICAL FIELD

The present disclosure relates to a suspension system and associated methods. More specifically, a modular, single-axle suspension system for trailers or other vehicles and associated methods are disclosed. The present suspension system can be conveniently assembled, adjusted, and disassembled.

BACKGROUND

Trailers are popular for transportation and recreational uses. Traditional suspension systems for trailers are usually assembled in factories and require specially designed tools to do so (e.g., a spring tensioner). Users cannot adjust, assemble, disassemble, and repair/maintain these traditional suspension systems conveniently. Therefore, it is advantageous to have an improved system to address the foregoing need.

SUMMARY

The present disclosure provides modular suspension systems for trailers and other vehicles and associated methods for assembling, disassembling, adjusting, maintaining, and operating the suspension systems. In some embodiments, the suspension system includes (1) a hydraulic component configured to attach to a platform structure of a trailer or a vehicle, (2) one or more first shock-absorbing component; (3) a second shock-absorbing component (e.g., an elastic ball); (4) a connecting member configured to position and connect the first shock-absorbing component and the second shock-absorbing component such that the first and second shock-absorbing components can absorb forces from a wheel of the trailer/vehicle; and (5) a housing configured to attach to the platform structure and accommodate the connecting member and the first/second shock-absorbing components. Embodiments of the suspension systems are discussed in detail with reference to FIGS. 1-5.

In some embodiments, the hydraulic component is configured to move the wheel of the trailer or the vehicle between a "stored" position and an "operation" position. The platform structure is configured to support other components of the trailer. In some embodiments, the platform structure can be sized in accordance with a shipping container such that a plurality of the platform structure can be stored therein. Embodiments of the trailer are discussed in detail with reference to FIGS. 7-12.

The suspension system can have various numbers of the first shock-absorbing components, depending on different designs and purposes. For example, the suspension system can include a larger number of first shock-absorbing components for a heavier trailer. In some embodiments, the first shock-absorbing component can be an elastic block. The elastic block can be modularized such that it can be stacked with one another. Embodiments of the first shock-absorbing component are discussed in detail with reference to FIG. 6A.

The second shock-absorbing component is configured to be connected with the first shock-absorbing components by the connecting member. In some embodiments, the second shock-absorbing component can be an elastic ball. Embodiments of the second shock-absorbing component are discussed in detail with reference to FIG. 6B.

The connecting member is configured to position and connect the first shock-absorbing component and the second shock-absorbing component. The connecting member includes a supporting base to support the first shock-absorbing component. In some embodiments, the supporting base can include a protrusion to be positioned in a recess of the first shock-absorbing component such that the two components can be secured and configured to absorb the forces from the wheel. The connecting member also includes a contacting surface configured to be in contact with the second shock-absorbing component such that the forces from the wheel can be absorbed. Embodiments of the connecting member are discussed in detail with reference to FIGS. 1-5.

The housing can include a first housing element (e.g., close to the platform structure; "platform side") and a second housing element (close to the wheel; "wheel-side"). The first and second housing elements can be coupled and decoupled conveniently so as to enable user access to the components of the suspension system (e.g., adding an additional first shock-absorbing component or remove one). Embodiments of the first and second housing elements discussed in detail with reference to FIGS. 1-5.

One aspect of the present disclose includes methods for assembling, disassembling, adjusting, and maintaining the components of the present suspension system. Another aspect of the present disclose includes methods for operating a wheel assembly with the present suspension system.

In some embodiments, the present method can be implemented by a tangible, non-transitory, computer-readable medium having processor instructions stored thereon that, when executed by one or more processors, cause the one or more processors to perform one or more aspects/features of the method described herein. In other embodiments, the present method can be implemented by a system comprising a computer processor and a non-transitory computer-readable storage medium storing instructions that when executed by the computer processor cause the computer processor to perform one or more actions of the method described herein.

BRIEF DESCRIPTION OF THE DRAWINGS

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

FIGS. 11A-11B are side, schematic views illustrating operations of another wheel assembly (e.g., double-wheel design) in accordance with one or more implementations of the present disclosure.

FIG. 12 is a flowchart of a method in accordance with one or more implementations of the present disclosure.

DETAILED DESCRIPTION

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

Figure 1:
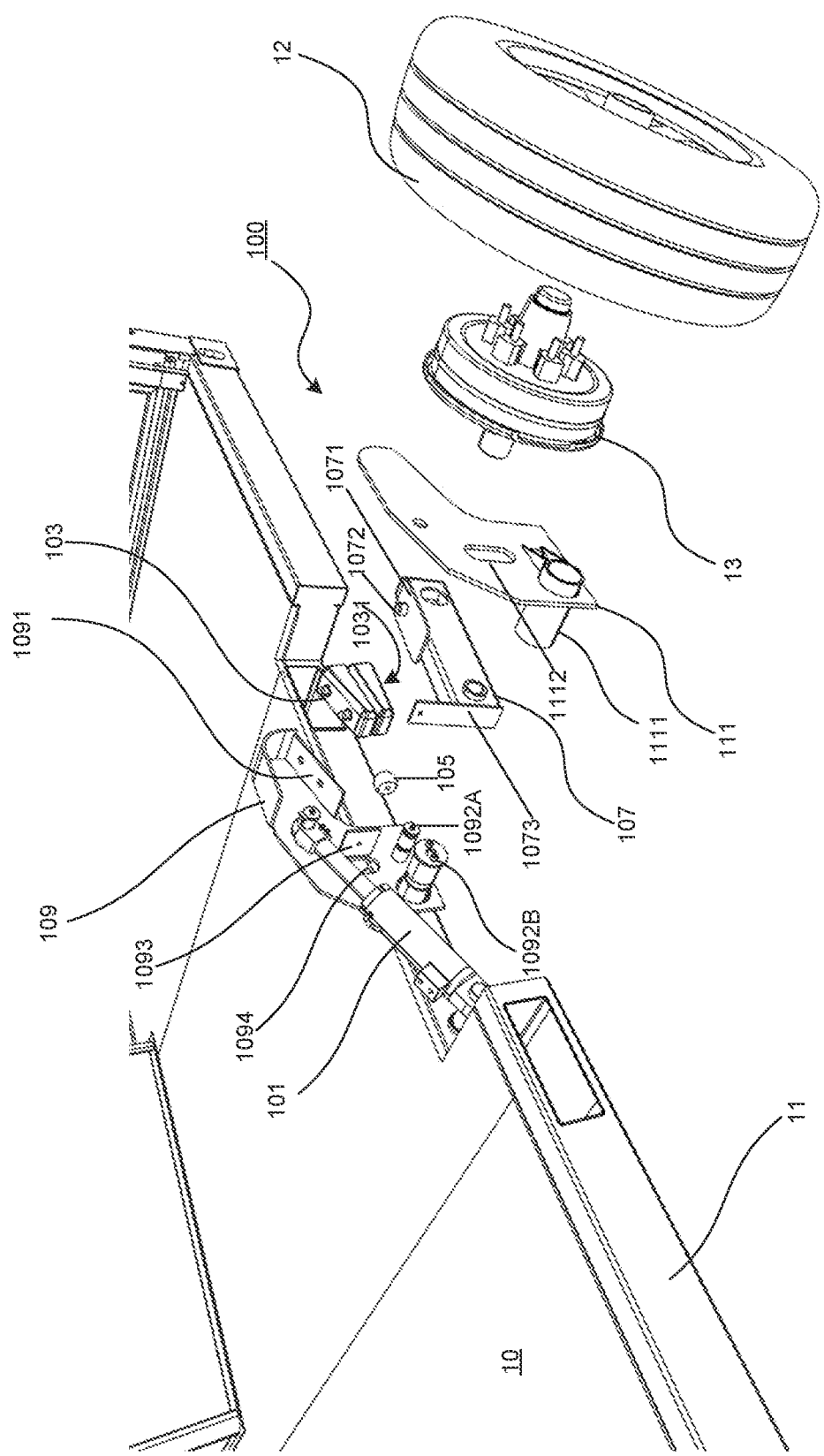
FIG. 1 is an isometric, exploded view of a suspension system in accordance with one or more implementations of the present disclosure.

FIG. 1 is an isometric, exploded view of a suspension system 100 in accordance with one or more implementations of the present disclosure. The suspension system includes a hydraulic component 101 configured to attach to a platform structure 11 of a trailer 10. The suspension system 100 also includes one or more first shock-absorbing components 103 (e.g., two are shown in FIG. 1), a second shock-absorbing component 105, and a connecting member 107 configured to position and connect the first shock-absorbing components 103 and the second shock-absorbing component 105 such that these shock-absorbing components can absorb forces from a wheel 12 of the trailer 10. As shown in FIG. 1, the wheel 12 is coupled to the platform structure 11 via a wheel hub assembly 13.

The connecting member 107 is configured to position and connect the first shock-absorbing components 103 and the second shock-absorbing component 105. As shown, the connecting member 107 includes a supporting base 1071 to support the first shock-absorbing component 105. In some embodiments, the supporting base 1071 can include a protrusion 1072. The protrusion 1072 can be positioned in a recess 1031 of the first shock-absorbing component 103 (e.g., at the bottom of the first shock-absorbing component 103). As shown in FIG. 1, the connecting member 107 also includes a contacting surface member 1073 configured to be in contact with the second shock-absorbing component 105. By connecting the first shock-absorbing components 103, the first and second shock-absorbing components 103, 105 are secured and configured to absorb the forces from the wheel 12.

The suspension system 100 also includes a first housing element 109 and a second housing element 111. The first housing element 109 and the second housing element 111 are configured to attach to the platform structure 11 and accommodate the connecting member 107 and the first/second shock-absorbing components 103, 105.

The first housing element 109 is close to the platform structure 11 and therefore can be called a "platform side" housing element. The second housing element 111 is close to the wheel 12 and this can be called a "wheel-side" housing component. The first and second housing elements 109, 111 can be coupled and decoupled conveniently so as to enable a user to access to the components of the suspension system 100 (e.g., adding an additional first shock-absorbing component 103 or remove one).

The first housing element 109 includes a first (slant) surface 1091 configured to be in contact with the first shock-absorbing component 103. In some embodiments, the first surface 1091 can include one or more holes configured to accommodate one or more extensions of the first shock-absorbing component 103.

The first housing element 109 can include a second (vertical) surface 1093 (e.g., the second surface is vertically aligned to the platform structure 11) configured to work with the contacting surface member 1073 of the connecting member 107 so as to hold the second shock-absorbing component 105 in place. The first housing element 109 also includes a first alignment member 1092A and a second alignment member 1092B configured to secure and position (the contacting surface member 1073 of) the connecting member 107.

In some embodiments, the first housing element 109 can also include an opening 1094 enabling the wheel hub assembly 13 to pass though such that the wheel 12 can be connected to the platform structure 11.

The second housing element 111 can include a sleeve component 1111 configured to accommodate and connect to the second alignment member 1092B of the first housing element 109. In some embodiments, the sleeve component 1111 can be configured to accommodate and connect to the first alignment member 1092A of the first housing element 109. The second housing element 111 can also include an opening 1112 configured to enable the wheel hub assembly 13 to pass though such that the wheel 12 can be connected to the platform structure 11.

Figure 2:
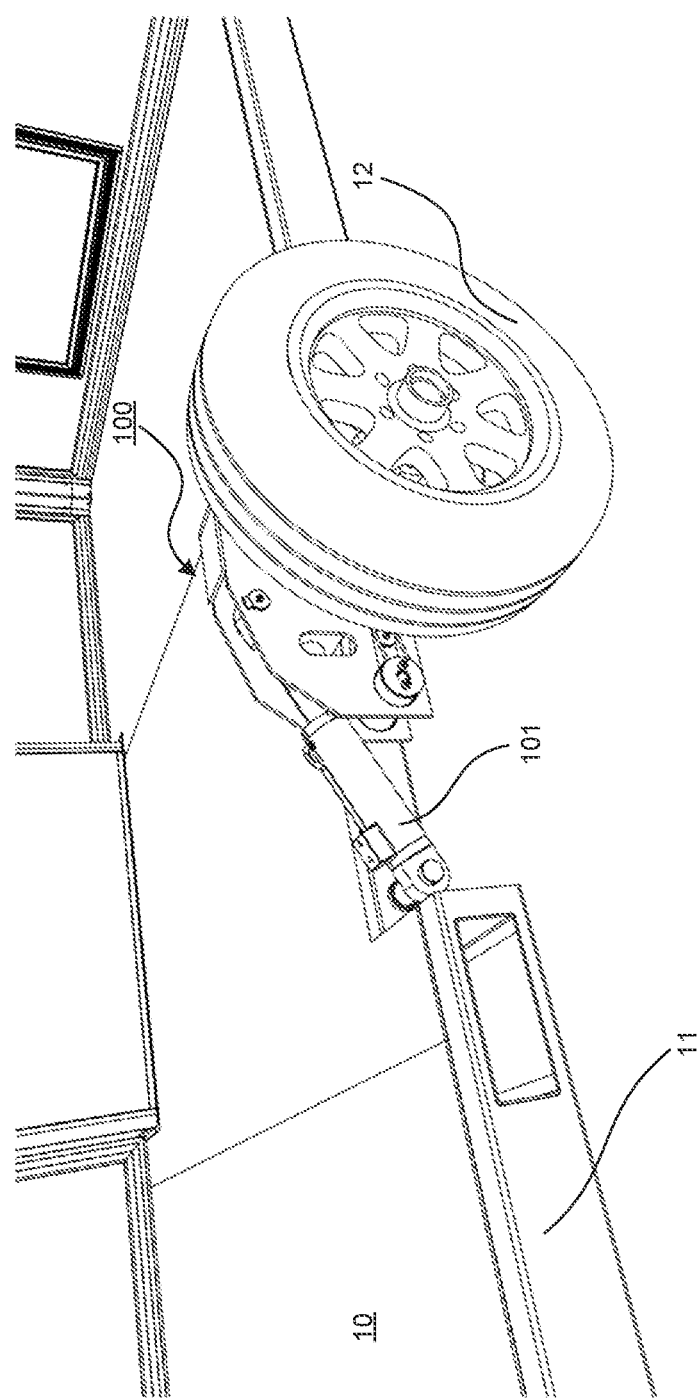
FIG. 2 is an isometric, schematic view of the suspension system in accordance with one or more implementations of the present disclosure.

FIG. 2 is an isometric, schematic view of the suspension system 100 in accordance with one or more implementations of the present disclosure. As shown in FIG. 2, the wheel 12 is at an "operation" position. When the wheel 12 is at the "operation" position, the trailer 10 can be moved or towed. The hydraulic component 101 can move the wheel 12 to a "stored" position. When the wheel 12 is at the "stored" position, the trailer 10 can be parked (e.g., at a camping site).

Figure 3:
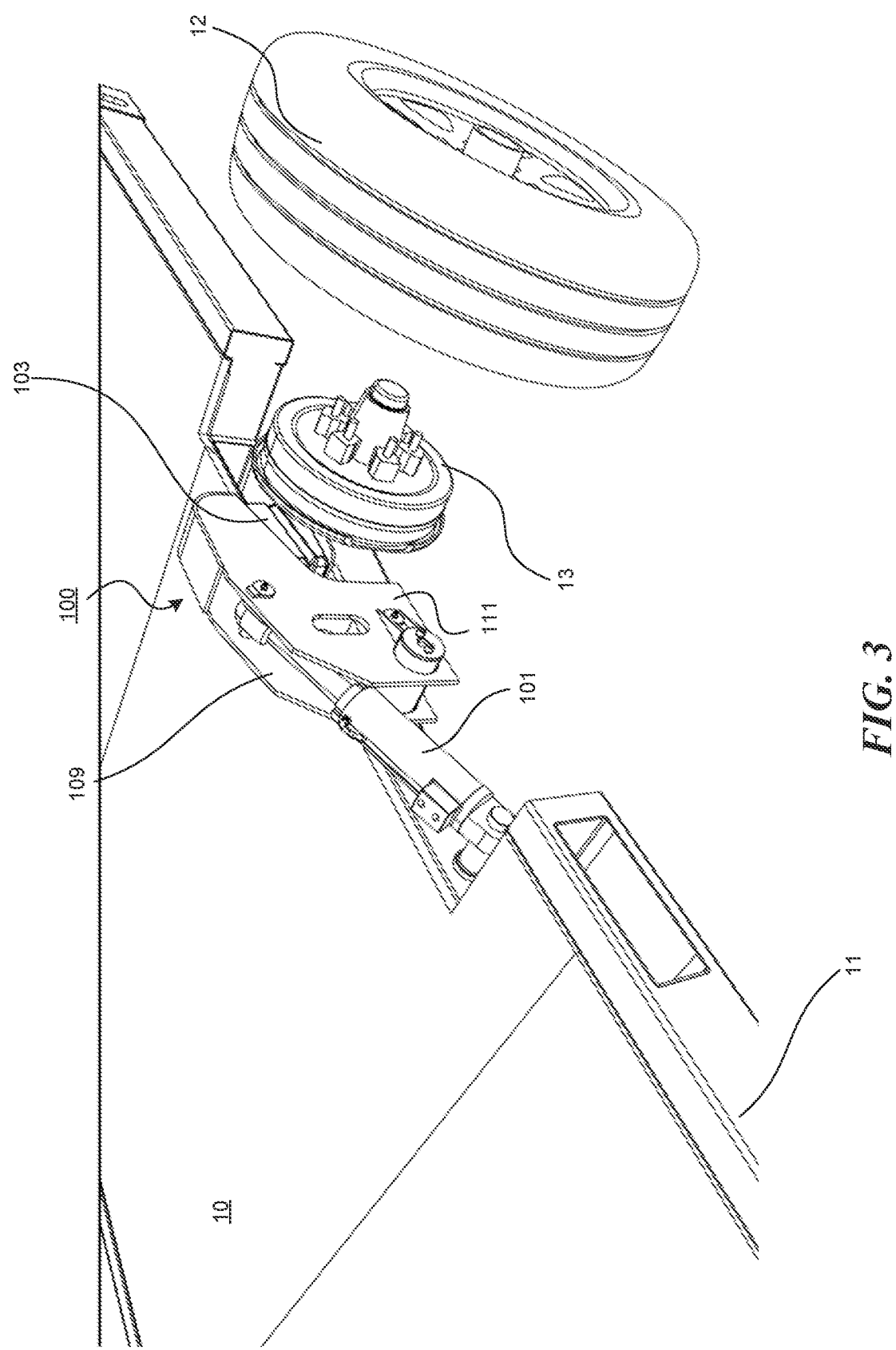
FIGS. 3 and 4 are isometric, schematic views of the suspension system with a detached wheel in accordance with one or more implementations of the present disclosure.
Figure 4:
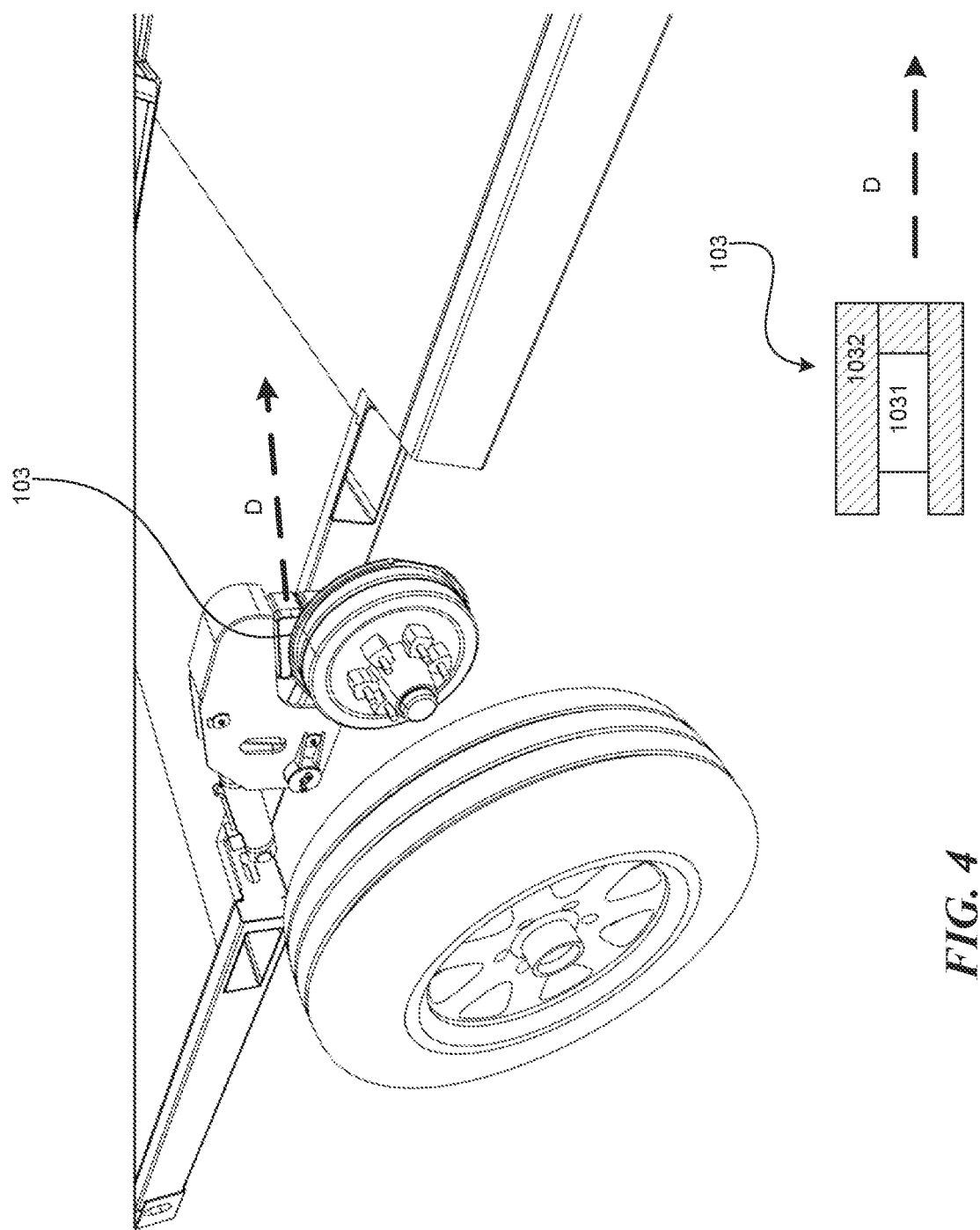

FIGS. 3 and 4 are isometric, schematic views of the suspension system 100 with a detached wheel 12 in accordance with one or more implementations of the present disclosure. As shown in FIG. 3, the first shock-absorbing components 103 can be positioned to absorb forces/shocks from the wheel hub assembly 13. In some embodiments, an operator can conveniently swap, add, or remove one of the one or more the first shock-absorbing components 103.

As shown in FIG. 4, the first shock-absorbing components 103 can be removed in direction D. As shown in the bottom of FIG. 4, in some embodiments, the first shock-absorbing component 103 can include a center portion 1031 and an external portion 1032 (patterned portion in FIG. 4). In some embodiments, the external portion 1032 can be swapped and removed so as to adjust a shock-absorbing capability of the first shock-absorbing components 103. For example, the external portion 1032 with a low elasticity can be replaced by another external portion 1032 with a high elasticity. In some embodiments, the external portion 1032 can include two or more partitions (e.g., three are shown in FIG. 4). In some embodiments, each of the partitions can have the same elasticity. In some embodiments, some of the partitions can have different elasticities. By this arrangement, the present suspension system 100 enable an operator to conveniently adjust the shock-absorbing capability of the system 100.). In some embodiments, the center portion 1031 and the external portion 1032 can be made of elastic materials such as resin, rubber, etc.

Figure 5:
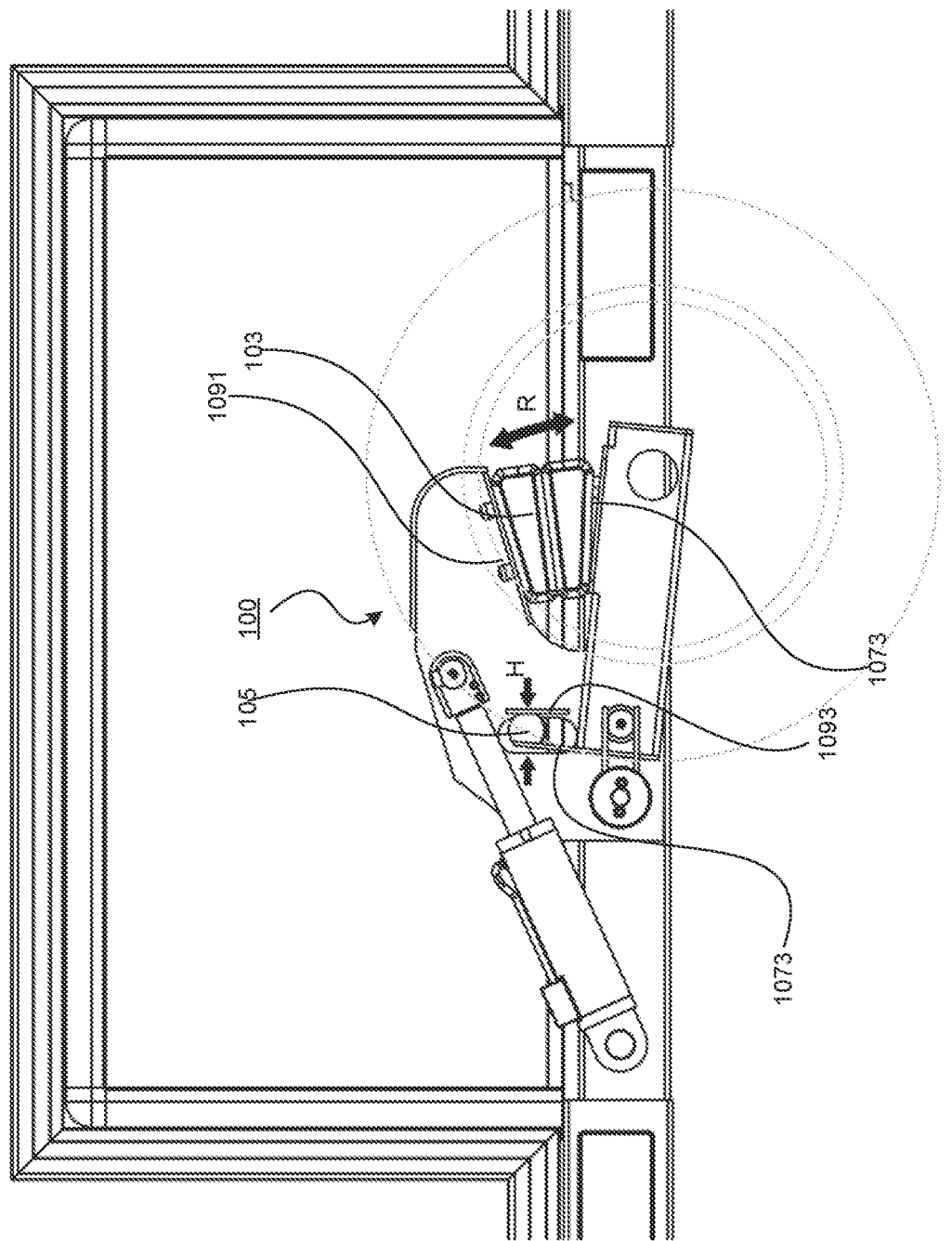
FIG. 5 is a side, schematic view of the suspension system in accordance with one or more implementations of the present disclosure.

FIG. 5 is a side, schematic view of the suspension system 100 in accordance with one or more implementations of the present disclosure. As shown, the contacting surface member 1073 (of the connecting member 107) and the second (vertical) surface 1093 (of the first housing element 109) work together to position the second shock-absorbing component 105 such that the second shock-absorbing component 105 can absorb forces in direction H.

As also shown in FIG. 5, the first shock-absorbing component 103 is positioned between the first (slant) surface 1091 (of the first housing element 109) and the supporting base 1071 (of the connecting member 107). By this arrangement, the first shock-absorbing component 103 is configured to absorb forces in direction R.

By providing both the first shock-absorbing component 103 and the second shock-absorbing component 105, the present suspension system 100 enable multi-directional shock absorbing, with a capability to adjust its absorbing capability (e.g., by selecting suitable (number, material, etc.) first shock-absorbing components 103). In some embodiments, the second shock-absorbing component 105 can be made of elastic materials such as resin, rubber, etc.

Figure 6:
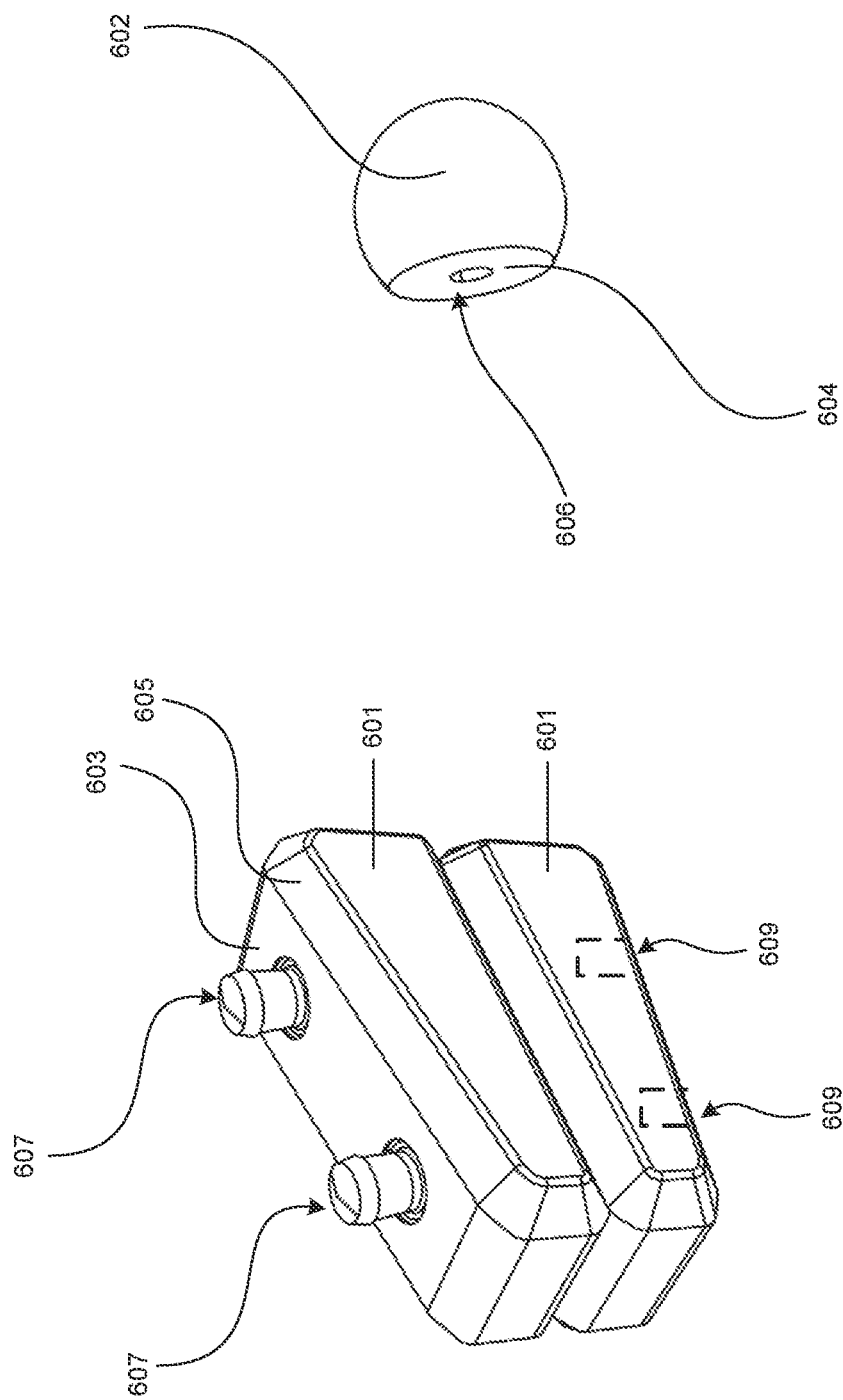
FIG. 6A is an isometric, schematic view of a first shock-absorbing component in accordance with one or more implementations of the present disclosure.
FIG. 6B is an isometric, schematic view of a second shock-absorbing component in accordance with one or more implementations of the present disclosure.

FIG. 6A is an isometric, schematic view of a first shock-absorbing component 601 in accordance with one or more implementations of the present disclosure. In FIG. 6A, two first shock-absorbing components 601 are stacked. In some embodiments, there can be three or more first shock-absorbing components 601 stackable on one another. As shown, the first shock-absorbing component 601 includes a first slant surface 603 and a second slant surface 605. The foregoing design enables easy installation and assembling/disassembling. Additionally, the first slant surface 603 facilitates a shock absorbing perpendicular to it (e.g., in direction R, FIG. 5).

The first shock-absorbing component 601 also includes one or more connecting members 607 configured to be positioned in a recess 609 of another first shock-absorbing component 601 stacked thereon. In the illustrated embodiments, the connecting members 607 can be screws. In some embodiments, the connecting members 607 can be any other suitable members such as a protrusion, an extension, a rod, a bolt, etc.

FIG. 6B is an isometric, schematic view of a second shock-absorbing component 602 in accordance with one or more implementations of the present disclosure. The second shock-absorbing component 602 includes a truncated spherical shape, with a truncated surface 604. The truncated surface 604 is configured to be in contact with a contacting surface (e.g., the contacting surface member 1073 of the connecting member 107). The second shock-absorbing component 602 also includes an opening 606 formed on the truncated surface 604 for facilitating positioning and securing the second shock-absorbing component 602. In some embodiments, the second shock-absorbing component 602 can have other suitable shapes such as a block, a rectangular cuboid, a cube, etc.

Figure 7:
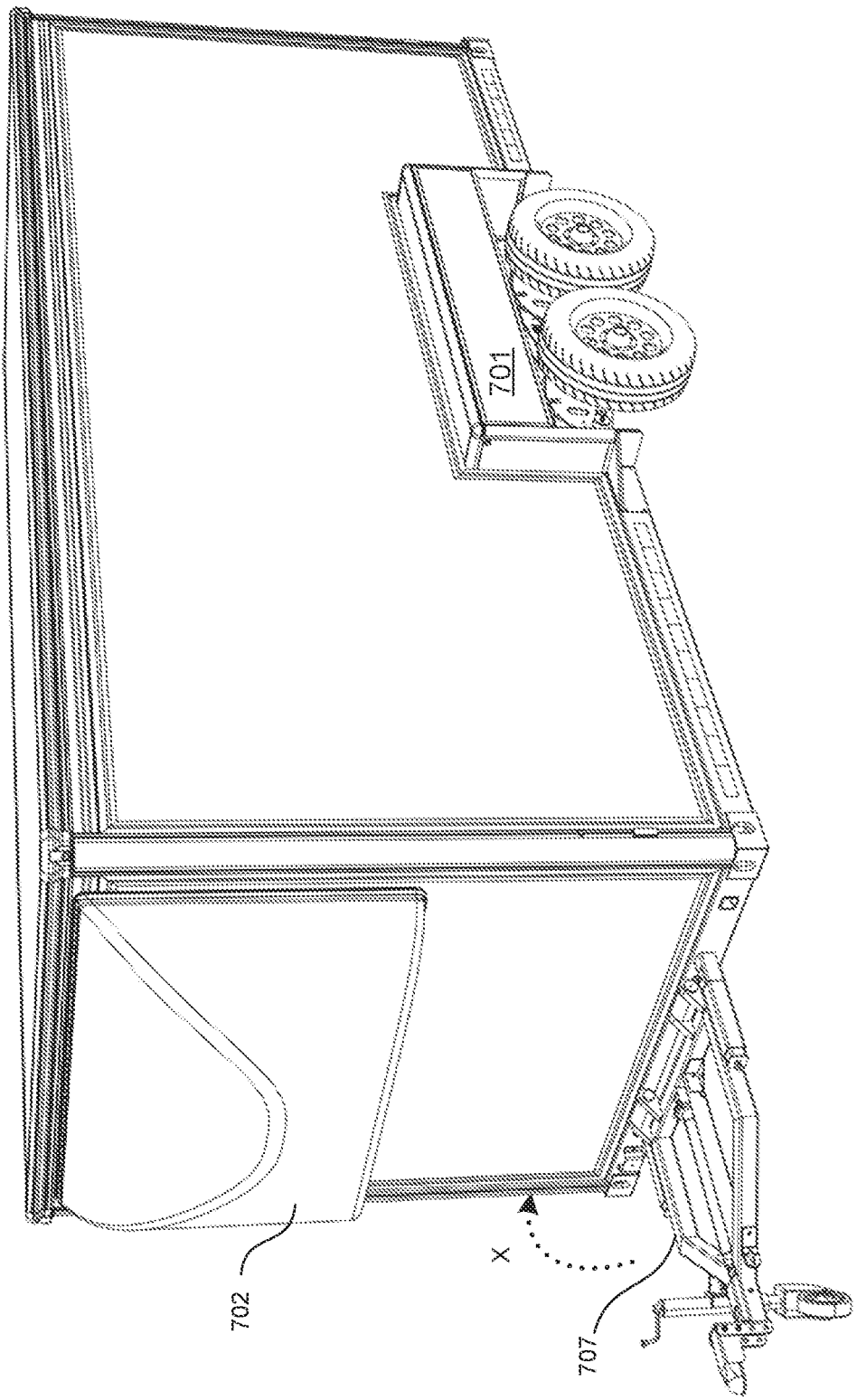
FIG. 7 is an isometric, schematic view of a trailer in accordance with one or more implementations of the present disclosure.

FIG. 7 is an isometric, schematic view of a trailer 700 in accordance with one or more implementations of the present disclosure. The trailer 700 includes a suspension system 701. Embodiments of the suspension system 701 includes the suspension system 100 discussed herein. As shown in FIG. 7, the trailer 700 includes a deflector module 702. The deflector module 702 is configured to improve aero-dynamic characteristics of the trailer 700. The deflector module 702 is engineered to a specific shape such that it can enhance aerodynamic performance of the trailer 700 as a whole.

In some embodiments, the deflector module 702 is also configured to accommodate other components of the trailer 700. For example, a towing bar assembly 707 can be folded (in direction X) and a portion of the towing bar assembly 707 can be stored inside the deflector module 702 when the towing bar assembly 707 is folded.

Figure 8A:
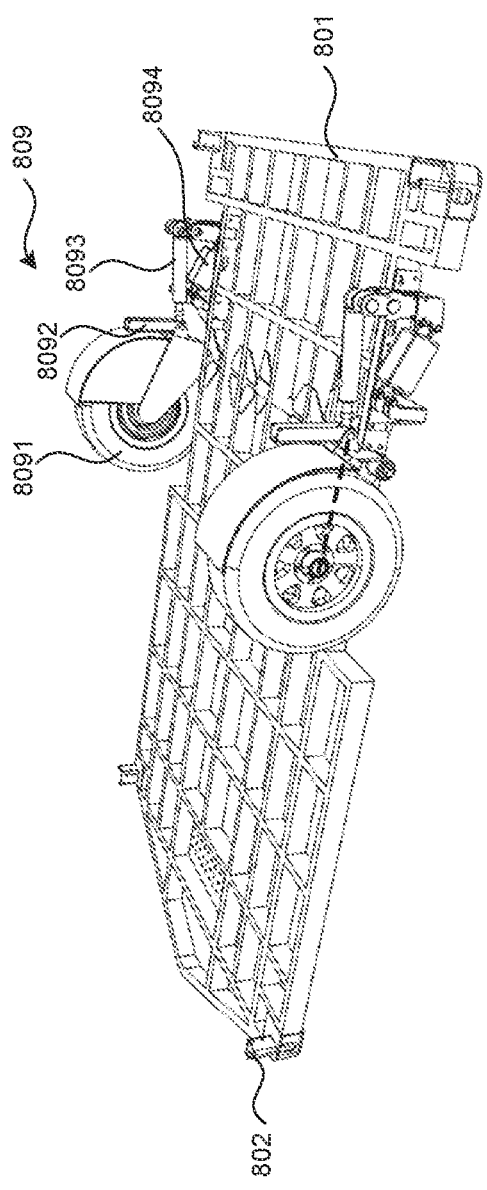
FIGS. 8A-8B are isometric, schematic views illustrating a platform structure and a wheel assembly in accordance with one or more implementations of the present disclosure.
Figure 8B:
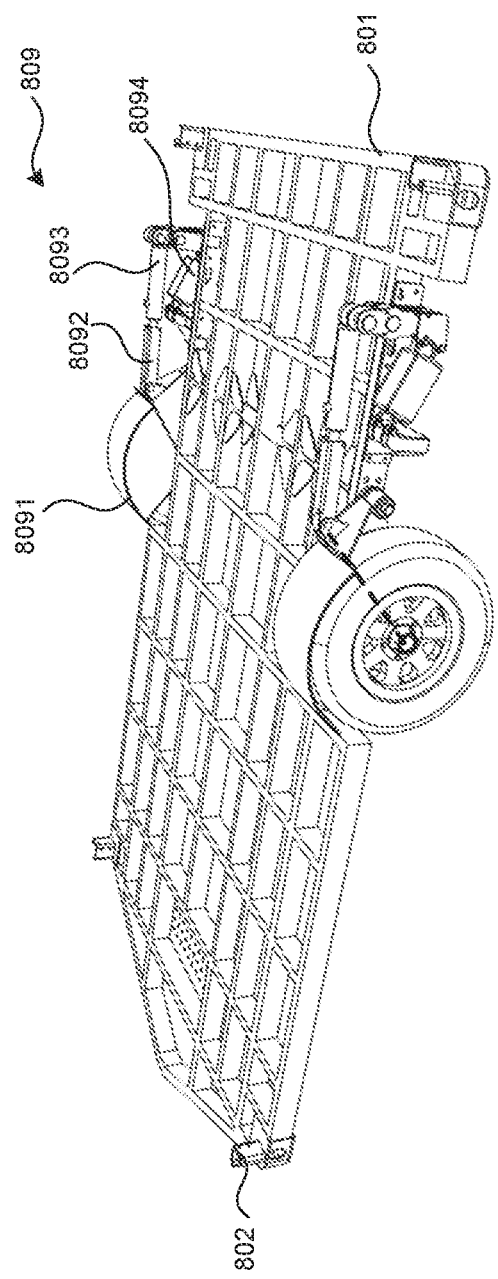

FIGS. 8A-8B are isometric, schematic views illustrating a platform structure 801 and a wheel assembly 809 in accordance with one or more implementations of the present disclosure. The suspension system discussed herein (e.g., the suspension system 100 and 701) can be installed on the platform structure 801 and work with the wheel assembly 809. As shown, the platform structure 801 includes a post 802 at each corner and the post 802 is configured to insert into and connect with a corner module.

As also shown in FIGS. 8A-8B, the wheel assembly 809 includes a wheel 8091, a first linking member 8092 and a second linking member 8093. The second linking member 8093 is further connected to a hydraulic component 8094 such that the second linking member 8093 can be moved by the hydraulic component 8094. When the second linking member 8093 is moved (e.g., the second linking member 8093 includes a piston therein and the piston can extend or retract such that the total length of the second linking member 8093 changes, which is characterized as the movement of the second linking member 8093), the wheel 8091 can be moved relatively to the first linking member 8092 (e.g., the first linking member 8092 serves as a guiding member or a track to control the movement of the wheel 8091. By the foregoing arrangement, the position of the wheel 8901 can be adjusted. In FIG. 8A, the wheel 8091 is in a "stored" position. In FIG. 8B, the wheel 8091 is in an "operation" position. In some embodiments, the foregoing movement can be controlled by a computing device with predetermined instructions and configuration, such that an operator can conveniently adjust the position of the wheel 8091 depending on various needs.

Figure 9A:
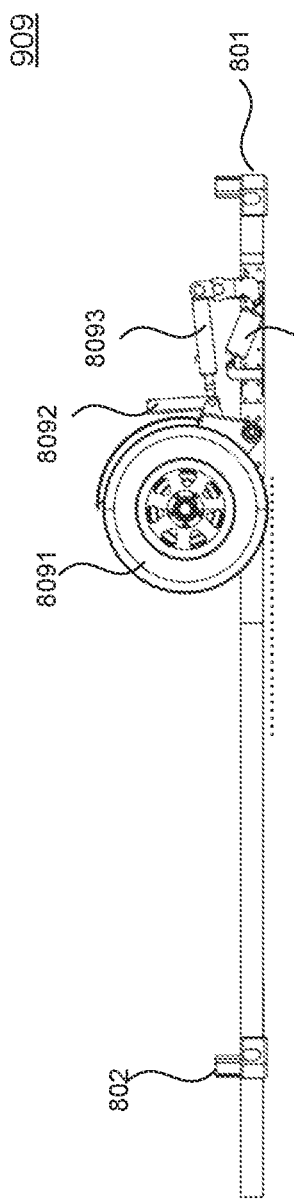
FIGS. 9A-9C are side, schematic views illustrating operations of a wheel assembly (e.g., single-wheel design) in accordance with one or more implementations of the present disclosure.
Figure 9B:
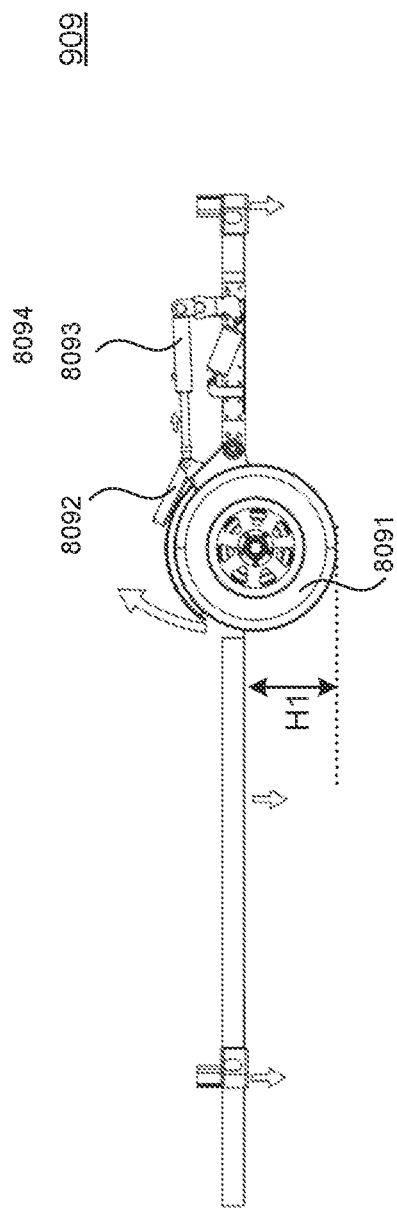
Figure 9C:
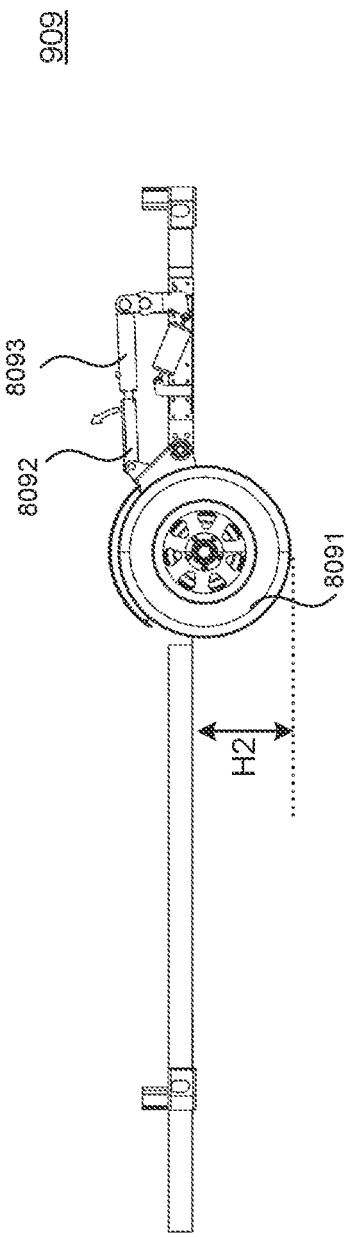

FIGS. 9A-9C are side, schematic views illustrating operations of a wheel assembly 909 (e.g., single-wheel design) in accordance with one or more implementations of the present disclosure. The wheel assembly 909 includes the wheel 8091, the first linking member 8092 and the second linking member 8093. The second linking member 8093 is further connected to the hydraulic component 8094 such that the second linking member 8093 can be moved by the hydraulic component 8094. When the second linking member 8093 is moved, the first linking member 8092 is also moved (e.g., the second linking member 8093 includes a piston therein and the piston can extend or retract such that the total length of the second linking member 8093 changes, which is characterized as the "movement" of the second linking member 8093), so does the wheel 8091.

As can be seen in FIG. 9A, the wheel 8091 is in a stored position, where an edge of wheel 8091 is generally parallel to the platform structure 801. In other words, the wheel 8091 is completely stored in the platform structure 801. At this stage, the first linking member 8092 and the second linking member 8093 are generally perpendicular to each other (e.g., forming a right angle as shown in FIG. 9A).

In FIG. 9O, the hydraulic component 8094 can move the wheel 8091 to an operation position. In this embodiments, the height between a ground surface and the platform structure 801 is "H2." At this stage, the first linking member 8092 and the second linking member 8093 are aligned and are generally in parallel.

In FIG. 9B, when an operator wants to adjust the height, the hydraulic component 8094 can move the second linking member 8093 such that the wheel 8091 retracts toward the platform structure 801. Accordingly, the height "H1" between the ground surface and the platform structure 801 is lower than "H2." In other words, the platform structure 801 (and accordingly the trailer system) is lowered. At this stage, the first linking member 8092 and the second linking member 8093 together form an angle (e.g., an obtuse angle as shown in FIG. 9B).

Figure 10A:
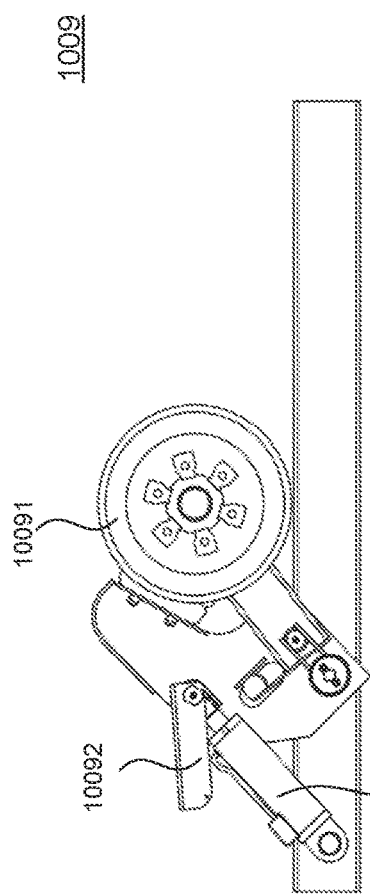
FIGS. 10A-10C are side, schematic views illustrating operations of another wheel assembly (e.g., single-wheel design) in accordance with one or more implementations of the present disclosure.
Figure 10B:
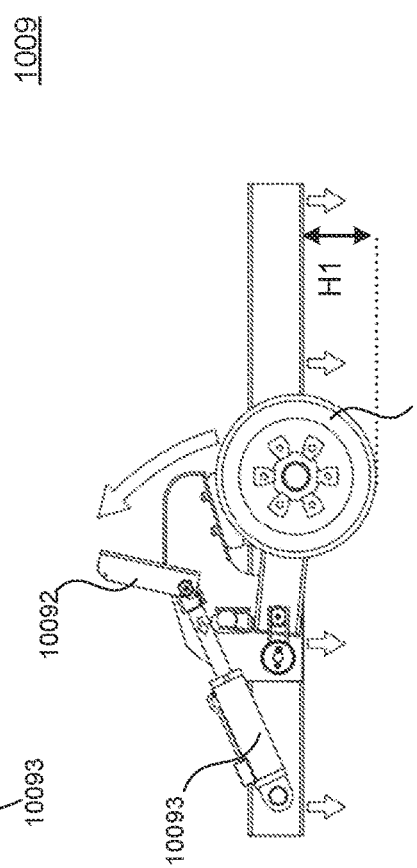
Figure 10C:
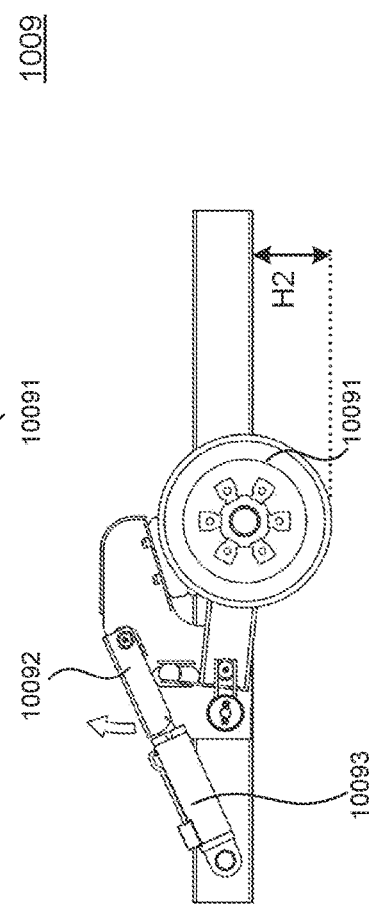

FIGS. 10A-10C are side, schematic views illustrating operations of another wheel assembly 1009 (e.g., single-wheel design) in accordance with one or more implementations of the present disclosure. Similar to the embodiments discussed in FIGS. 9A-9C, the wheel assembly 1009 includes a wheel 10091, a first linking member 10902 and a second linking member 10093. The second linking member 10093 is further connected to a hydraulic component such that the second linking member 10093 can be moved by the hydraulic component. When the second linking member 10093 is moved, the first linking member 10902 is also moved (e.g., the second linking member 10093 includes a piston therein and the piston can extend or retract such that the total length of the second linking member 10093 changes, which is characterized as the "movement" of the second linking member 10093), so does the wheel 8091.

As can be seen in FIG. 10A, the wheel 10091 is in a stored position. As shown, the wheel 10091 is completely stored in a platform structure. At this stage, the first linking member 10092 and the second linking member 10093 together form an acute angle.

In FIG. 10C, the hydraulic component can move the wheel 10091 to an operation position. In this embodiments, the height between a ground surface and the platform structure is "H2." At this stage, the first linking member 10092 and the second linking member 10093 are aligned and are generally in parallel.

In FIG. 10B, when an operator wants to adjust the height, the hydraulic component can move the second linking member 10093 such that the wheel 1001 retracts toward the platform structure. Accordingly, the height "H1" between the ground surface and the platform structure 801 is lower than "H2." In other words, the platform structure (and accordingly the trailer system) is lowered. At this stage, the first linking member 10092 and the second linking member 10093 together form an obtuse angle as shown in FIG. 10B.

FIGS. 11A-11B are side, schematic views illustrating operations of a wheel assembly 1109 (e.g., double-wheel design) in accordance with one or more implementations of the present disclosure. Compared to the embodiments described in FIGS. 10A-10C, the wheel assembly 1109 has a double-wheel design and can be moved by mechanisms similar to those described above with reference to FIGS. 10A-10C. The difference is that the wheel assembly 1109 includes an alignment member 1101 configured to coordinate the movement of a first wheel 1191A and as second wheel 1191B of the wheel assembly 1109. The wheel assembly 1109 includes a first bracket 1103A connected to the first wheel 1191A and operably/rotatably connected to the alignment member 1101. The wheel assembly 1109 also includes a second bracket 1103B connected to the second wheel 1191B and operably/rotatably connected to the alignment member 1101. By the foregoing configuration, the alignment member 1101 is configured to align or guide the movement of the first and second wheels 1191A, 1191B such that they can generally be aligned horizontally.

FIG. 12 is a flowchart of a method for assembling a suspension system (e.g., the suspension system 100 or 701) for a trailer in accordance with one or more implementations of the present disclosure. The method 1200 includes, at block 1201, stacking two or more first shock-absorbing components. At block 1203, the method 1200 continues by connecting the two or more first shock-absorbing components to a supporting base of a connecting member.

At block 1205, the method 1200 continues by positioning the first shock-absorbing component between the supporting base of the connecting member and a slant surface of a first housing element. At block 1207, the method 1200 continues by connecting a second shock-absorbing component to a contacting surface member of the connecting member. At block 1209, the method 1200 continues by positioning the second shock-absorbing component between the contacting surface member of the connecting member and a vertical surface of the first housing element.

Figure 13:
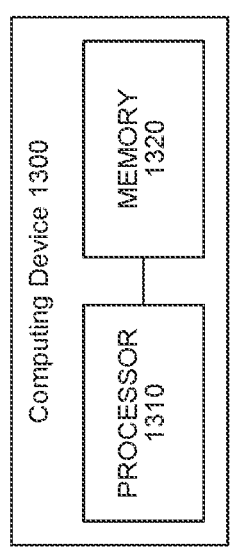
FIG. 13 is a block diagram a computing device that can be used to implement the methods disclosed herein in accordance with one or more implementations of the present disclosure.

FIG. 13 is a schematic block diagram of a computing device 1300 (e.g., which can implement the methods discussed herein) in accordance with one or more implementations of the present disclosure. As shown, the computing device 1300 includes a processing unit 1310 (e.g., a DSP, a CPU, a GPU, etc.) and a memory 1320. The processing unit 1310 can be configured to implement instructions that correspond to the methods discussed herein and/or other aspects of the implementations described above. It should be understood that the processor 1310 in the implementations of this technology may be an integrated circuit chip and has a signal processing capability. During implementation, the steps in the foregoing method may be implemented by using an integrated logic circuit of hardware in the processor 1310 or an instruction in the form of software. The processor 1310 may be a general-purpose processor, a digital signal processor (DSP), an application specific integrated circuit (ASIC), a field programmable gate array (FPGA) or another programmable logic device, a discrete gate or transistor logic device, and a discrete hardware component. The methods, steps, and logic block diagrams disclosed in the implementations of this technology may be implemented or performed. The general-purpose processor 1310 may be a microprocessor, or the processor 1310 may be alternatively any conventional processor or the like. The steps in the methods disclosed with reference to the implementations of this technology may be directly performed or completed by a decoding processor implemented as hardware or performed or completed by using a combination of hardware and software modules in a decoding processor. The software module may be located at a random-access memory, a flash memory, a read-only memory, a programmable read-only memory or an electrically erasable programmable memory, a register, or another mature storage medium in this field. The storage medium is located at a memory 1320, and the processor 1310 reads information in the memory 1320 and completes the steps in the foregoing methods in combination with the hardware thereof.

It may be understood that the memory 1320 in the implementations of this technology may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random-access memory (RAM) and is used as an external cache. For exemplary rather than limitative description, many forms of RAMs can be used, and are, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM). It should be noted that the memories in the systems and methods described herein are intended to include, but are not limited to, these memories and memories of any other suitable type. In some embodiments, the memory may be a non-transitory computer-readable storage medium that stores instructions capable of execution by a processor.

Figure 14:
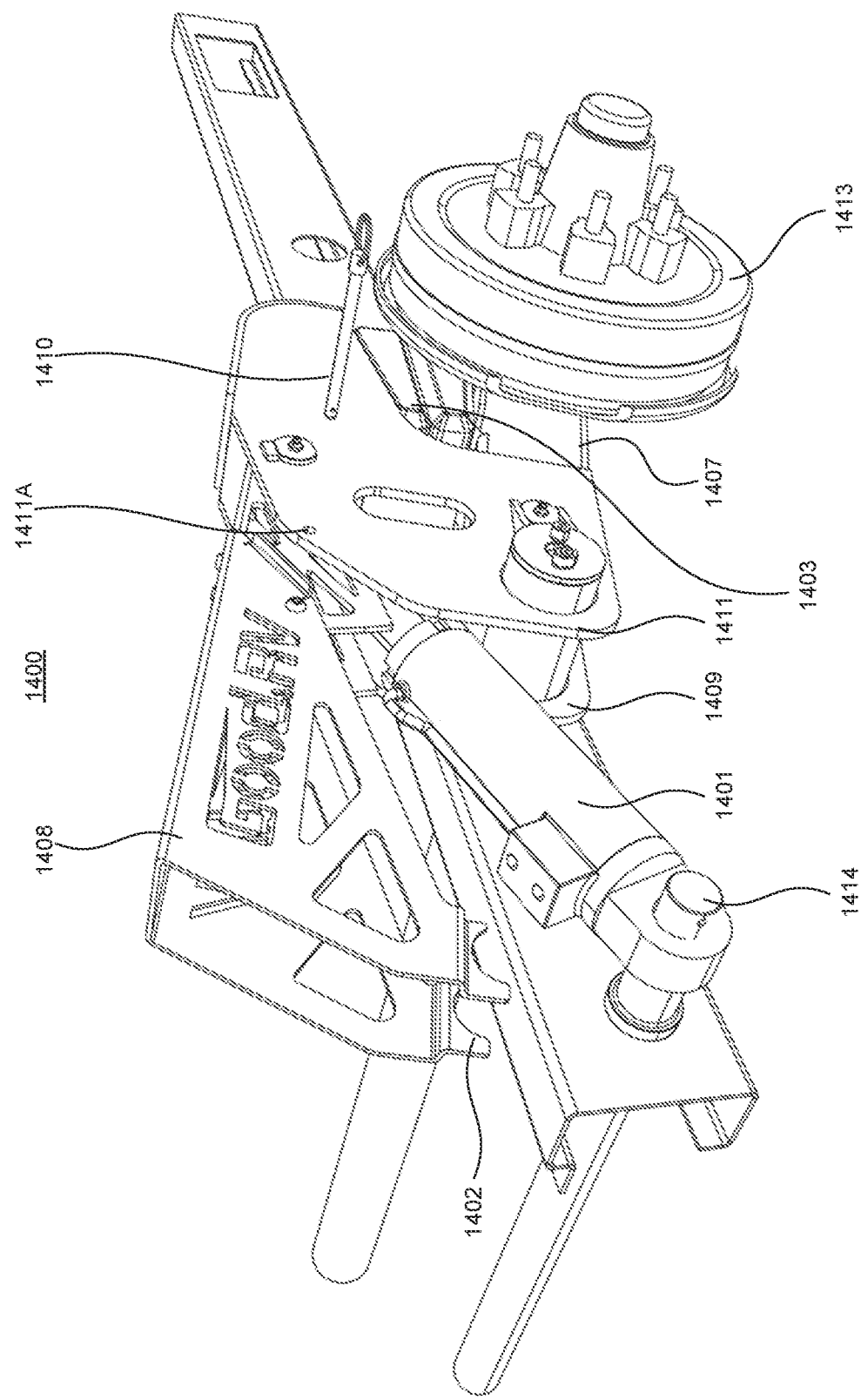
FIG. 14 is an isometric, schematic view of a suspension system in accordance with one or more implementations of the present disclosure.

FIG. 14 is an isometric, schematic views of a suspension system 1400 in accordance with one or more implementations of the present disclosure. As shown in FIG. 14, a first shock-absorbing components 1403 can be positioned to absorb forces/shocks from a wheel hub assembly 1413. In some embodiments, an operator can conveniently swap, add, or remove one of the one or more the first shock-absorbing components 1403. Embodiments of the first shock-absorbing components 1403 are discussed in detail with reference to FIG. 4.

As also shown in FIG. 14, the suspension system 1400 includes a hydraulic component 1401 configured to attach to a platform structure of a trailer. The suspension system 1400 also includes one or more first shock-absorbing components 1403 (e.g., two are shown in FIG. 14), a second shock-absorbing component (not visible in FIG. 14; e.g., the second shock-absorbing component 105 shown in FIG. 1), and a connecting member 1407 configured to position and connect the first shock-absorbing components 1403 and the second shock-absorbing component such that these shock-absorbing components can absorb forces from a wheel of the trailer. The wheel can be coupled to the platform structure via a wheel hub assembly 1413.

The connecting member 1407 is configured to connect the first shock-absorbing components 1403 and the second shock-absorbing component such that these shock-absorbing components are secured and configured to absorb the forces from the wheel of the trailer. The suspension system 1400 includes a first housing element 1409 and a second housing element 1411. The first housing element 1409 and the second housing element 1411 are configured to attach to the platform structure and accommodate the connecting member 1407 and the first shock-absorbing component 1403 and the second shock-absorbing component.

The suspension system 1400 also includes a cover 1408 configured to protect the components of the suspension system 1400 (e.g., the hydraulic component 1401, etc.) and a locking pin 1410 configured to secure the cover 1408 with the first housing element 1409 and the second housing element 1411. When the locking pin 1410 is in a "lock" position, the locking pin 1410 is positioned to pass through a first hole (not shown in FIG. 14) of the first housing element 1409, the cover 1408, and a second hole 1411A of the second housing element 1411. By this arrangement, the cover 1408 is secured.

In some embodiments, the locking pin 1410 can also pass though the connecting member 1407 such that the suspension system 1400 can be in a stored position in a secured manner. For example, when the trailer is stored, stacked, and transported, the suspension system 1400 can be securely stored and does not move around.

As shown in FIG. 14, the cover 1408 includes at least one arc component 1402 configured to be operably connected with an axle 1414 that holds the hydraulic component 1401. In the illustrated embodiments, there are two arc components 1402 configured to be positioned on both sides of the hydraulic component 1401.

Figure 15:
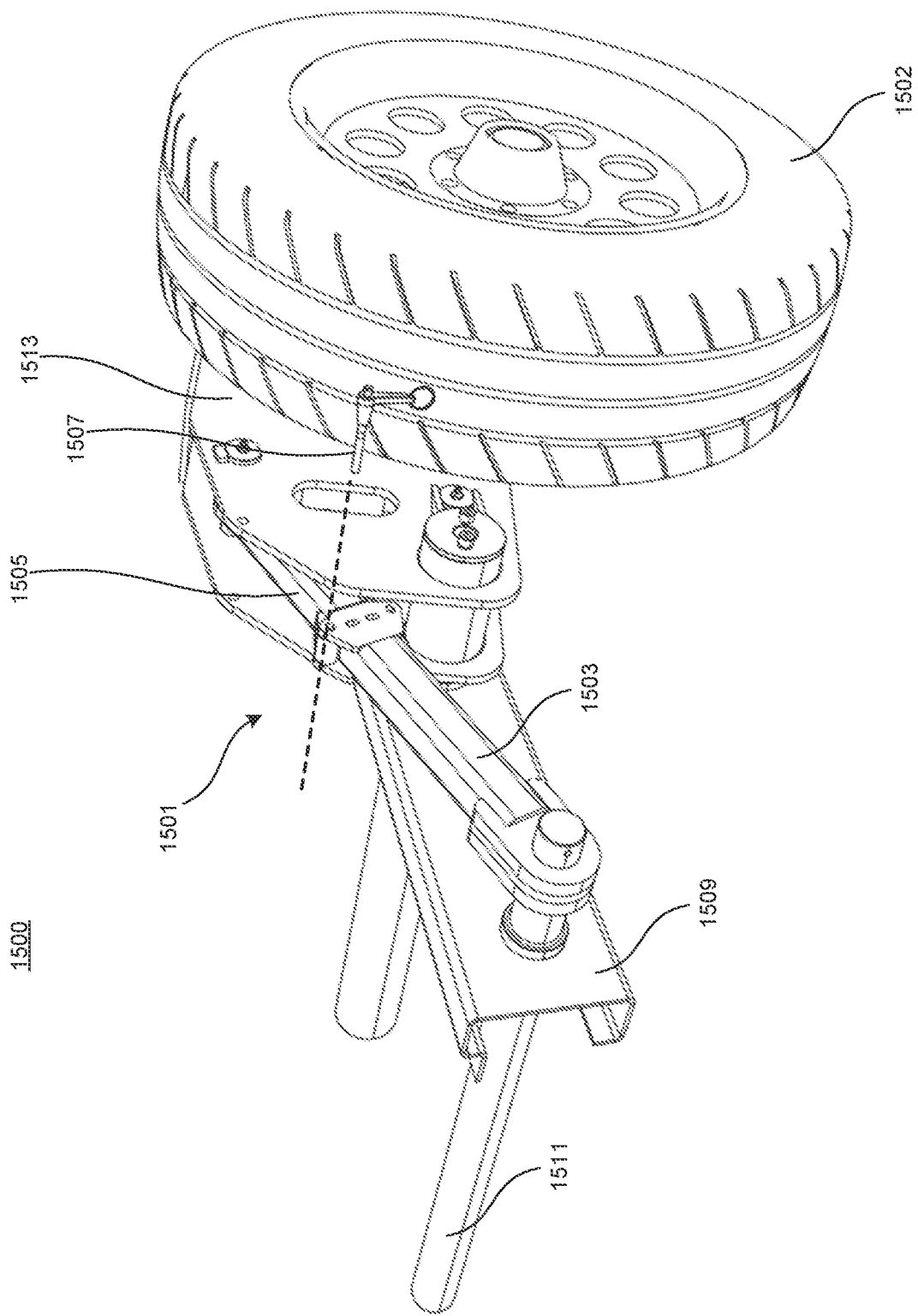
FIG. 15 is an isometric, schematic view of a suspension system in accordance with one or more implementations of the present disclosure.
Figure 16:
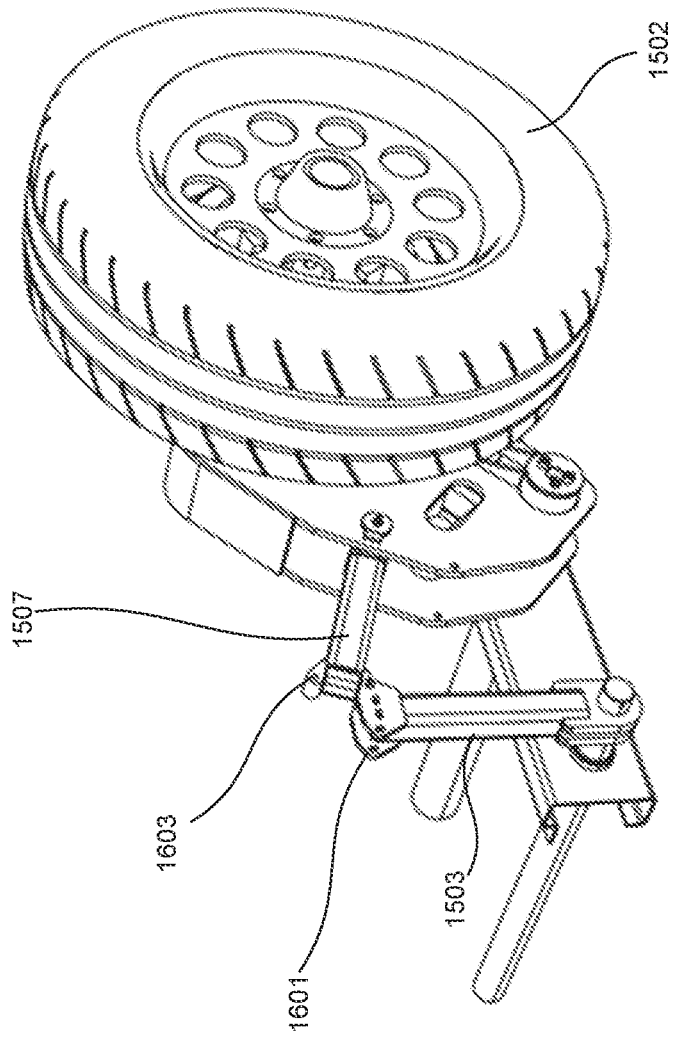
FIG. 16 is an isometric, schematic view illustrating operations of the suspension system in accordance with one or more implementations of the present disclosure.

FIG. 15 is an isometric, schematic view of a suspension system 1500 in accordance with one or more implementations of the present disclosure. FIG. 16 is an isometric, schematic view illustrating operations of the suspension system 1500 in accordance with one or more implementations of the present disclosure. The suspension system 1500 includes a manual drop-down mechanism 1501. In some embodiments, the suspension system 1500 can replace a suspension system with a hydraulic component (e.g., the hydraulic component 1401). The manual drop-down mechanism 1501 enables an operator to manually drop down and store a wheel 1502 of a trailer.

As shown in FIGS. 15 and 16, the manual drop-down mechanism includes a first member 1503, a second member 1505, and a safety pin 1507. The first member 1503 is coupled to a frame 1509 of the trailer. In the illustrated embodiments, the first member 1503 is rotatably coupled to the frame 1509 by a connecting bar 1511. In other embodiments, the first member 1503 can be coupled to the frame 1509 by any other suitable means. The second member 1505 is coupled to the wheel 1502 by a housing module 1513 (e.g., the housing module 1513 can have housing elements such as the first housing element 1409 and the second housing element 1411 discussed above with reference to FIG. 14).

The safety pin 1507 is configured to secure and connect the first member 1503 and the second member 1505. In the illustrated embodiments, the first member 1503 and the second member 1505 are aligned and securely connected by the safety pin 1507. When the first member 1503 and the second member 1505 are aligned, the suspension system 1500 is in an "operation" position, and the trailer can be operated, towed, moved, and/or parked.

When the operator wants to manually drop down and store the wheel 1502 of the trailer, the operator can first temporarily lift the trailer (e.g., in the corners by using shipping container jacks). Once the trailer is temporarily lifted, the operator can pull out the safety pin 1507. The operator can then lower the trailer all the way to a ground (e.g., by lowering the shipping container jacks), such that the wheel 1502 can be pushed by the ground to a "stored" position, as shown in FIG. 16. The trailer can then be stored.

When the operator wants to operate the trailer, the operator can first lift the trailer until a first hole 1601 of the first member 1503 and a second hole 1603 of the second member 1507 are aligned. The operator can then insert the safety pin 1507 and position is to pass through the first hole 1601 of the first member 1503 and the second hole 1603 of the second member 1507. The first member 1503 and the second member 1507 can then be aligned and the suspension system 1500 is back to the "operation" position, and the trailer can be operated, towed, moved, and/or parked.

ADDITIONAL CONSIDERATIONS

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the described technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative implementations or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

In the Detailed Description, numerous specific details are set forth to provide a thorough understanding of the presently described technology. In other implementations, the techniques introduced here can be practiced without these specific details. In other instances, well-known features, such as specific functions or routines, are not described in detail in order to avoid unnecessarily obscuring the present disclosure. References in this description to "an implementation/embodiment," "one implementation/embodiment," or the like mean that a particular feature, structure, material, or characteristic being described is included in at least one implementation of the described technology. Thus, the appearances of such phrases in this specification do not necessarily all refer to the same implementation/embodiment. On the other hand, such references are not necessarily mutually exclusive either. Furthermore, the particular features, structures, materials, or characteristics can be combined in any suitable manner in one or more implementations/embodiments. It is to be understood that the various implementations shown in the figures are merely illustrative representations and are not necessarily drawn to scale.

Several details describing structures or processes that are well-known and often associated with communications systems and subsystems, but that can unnecessarily obscure some significant aspects of the disclosed techniques, are not set forth herein for purposes of clarity. Moreover, although the following disclosure sets forth several implementations of different aspects of the present disclosure, several other implementations can have different configurations or different components than those described in this section. Accordingly, the disclosed techniques can have other implementations with additional elements or without several of the elements described below.

Many implementations or aspects of the technology described herein can take the form of computer- or processor-executable instructions, including routines executed by a programmable computer or processor. Those skilled in the relevant art will appreciate that the described techniques can be practiced on computer or processor systems other than those shown and described below. The techniques described herein can be implemented in a special-purpose computer or data processor that is specifically programmed, configured, or constructed to execute one or more of the computer-executable instructions described below. Accordingly, the terms "computer" and "processor" as generally used herein refer to any data processor. Information handled by these computers and processors can be presented at any suitable display medium. Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The term "and/or" in this specification is only an association relationship for describing the associated objects, and indicates that three relationships may exist, for example, A and/or B may indicate the following three cases: A exists separately, both A and B exist, and B exists separately.

These and other changes can be made to the disclosed technology in light of the above Detailed Description. While the Detailed Description describes certain examples of the disclosed technology, as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

A person of ordinary skill in the art may be aware that, in combination with the examples described in the implementations disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:
1. A suspension system for a trailer, comprising:
one or more first shock-absorbing components stacked in a first direction;
a second shock-absorbing component; and a connecting member configured to position and connect the first shock-absorbing components and the second shock-absorbing component, wherein the first shock-absorbing component incudes a center portion and an external portion, wherein the external portion is movable in a second direction generally perpendicular to the first direction for adjusting a shock-absorbing capability of the first shock-absorbing component, wherein the connecting member includes a supporting base configured to support the first shock-absorbing component; and wherein the connecting member includes a contacting surface member configured to be in contact with the second shock-absorbing component.

2. The system of claim 1, further comprising a first housing element connected to the one or more first shock-absorbing components, wherein the first housing element is connected to a platform structure of the trailer.

3. The system of claim 2, further comprising a hydraulic component configured to connect with the first housing element and the platform structure of the trailer.

4. The system of claim 2, wherein the first housing element includes a first alignment member and a second alignment member configured to secure and position the contacting surface member of the connecting member.

5. The system of claim 2, wherein the first housing element includes a first surface, and wherein the one or more first shock-absorbing components is positioned between the first surface and the supporting base of the connecting member.

6. The system of claim 5, wherein the first surface of the first housing element includes a slant surface.

7. The system of claim 5, wherein the first housing element includes a second surface, and wherein the second shock-absorbing component is positioned between the second surface and the contacting surface member of the connecting member.

8. The system of claim 7, wherein the second surface of the first housing element includes a vertical surface.

9. The system of claim 2, further comprising a second housing element configured to be coupled with the first housing element.

10. The system of claim 9, wherein the second housing element includes a sleeve component configured to accommodate an alignment member of the first housing element.

11. The system of claim 9, wherein the second housing element includes an opening configured to enable a wheel hub assembly to pass though such that a wheel is connected to a platform structure of the trailer.

12. The system of claim 1, wherein at least one of the one or more first shock-absorbing components includes a center portion and an external portion.

13. The system of claim 12, wherein the center portion and the external portion include a same elastic material.

14. The system of claim 12, wherein the center portion and the external portion include at least two different elastic materials.

15. The system of claim 1, wherein the one or more first shock-absorbing components include two stacked modular first shock-absorbing components.

16. The system of claim 1, wherein at least one of the one or more first shock-absorbing components includes a first slant surface and a second slant surface.

17. The system of claim 1, wherein at least one of the one or more first shock-absorbing components includes a connecting member.

18. The system of claim 1, wherein the second shock-absorbing component has a spherical shape and includes a truncated surface.

* * * * *